US011565674B2

(12) United States Patent
Baehrle-Miller et al.

(10) Patent No.: US 11,565,674 B2
(45) Date of Patent: Jan. 31, 2023

(54) HYDRAULIC BRAKE SYSTEM FOR A VEHICLE, AND CORRESPONDING OPERATING METHOD

(71) Applicant: Robert Bosch GmbH, Stuttgart (DE)

(72) Inventors: Frank Baehrle-Miller, Schoenaich (DE); Klaus Landesfeind, Backnang (DE); Klaus-Dieter Nijakowski, Heilbronn (DE); Edith Mannherz, Yokohama (JP); Hubertus Wienken, Langenbrettach (DE); Christoph Brand, Wuerzburg (DE); Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 16/772,599

(22) PCT Filed: Dec. 7, 2018

(86) PCT No.: PCT/EP2018/083914
§ 371 (c)(1),
(2) Date: Jun. 12, 2020

(87) PCT Pub. No.: WO2019/121055
PCT Pub. Date: Jun. 27, 2019

(65) Prior Publication Data

US 2021/0078554 A1 Mar. 18, 2021

(30) Foreign Application Priority Data

Dec. 21, 2017 (DE) ..................... 10 2017 223 497.0

(51) Int. Cl.
*B60T 13/14* (2006.01)

(52) U.S. Cl.
CPC .......... *B60T 13/147* (2013.01); *B60T 13/148* (2013.01); *B60T 2270/14* (2013.01);
(Continued)

(58) Field of Classification Search
CPC .. B60T 13/147; B60T 13/148; B60T 2270/14; B60T 2270/203; B60T 2270/306; B60T 2270/84
See application file for complete search history.

(56) References Cited

FOREIGN PATENT DOCUMENTS

| | | | |
|---|---|---|---|
| CN | 101909955 A | 12/2010 | |
| DE | 102011006218 A1 * | 10/2012 | ............. B60T 7/122 |

(Continued)

OTHER PUBLICATIONS

International Search Report corresponding to PCT Application No. PCT/EP2018/083914, dated Feb. 27, 2019 (German and English language document) (5 pages).

*Primary Examiner* — Melanie Torres Williams
(74) *Attorney, Agent, or Firm* — Maginot, Moore & Beck LLP

(57) ABSTRACT

A hydraulic brake system for a vehicle includes a master brake cylinder, a hydraulic unit, and multiple wheel brakes. The hydraulic unit Ha at least one brake circuit for modulating the braking pressure in the wheel brakes. At least one wheel brake is paired with a bistable solenoid valve, which is looped into the corresponding fluid channel directly upstream of the paired wheel brake and which enables the braking pressure in the paired wheel brake to be modulated in a de-energized open position and locks the current braking pressure in the paired wheel brake in a de-energized closed position, wherein a volume equalization device which comprises a connectable accumulator opens into the corresponding fluid channel between the bistable solenoid valve and the paired wheel brake.

14 Claims, 3 Drawing Sheets

(52) U.S. Cl.
CPC ... *B60T 2270/203* (2013.01); *B60T 2270/306* (2013.01); *B60T 2270/84* (2013.01)

(56) References Cited

FOREIGN PATENT DOCUMENTS

| | | |
|---|---|---|
| DE | 10 2013 217 106 | 3/2015 |
| DE | 10 2015 214 119 | 2/2017 |
| JP | 2011-511907 A | 4/2011 |
| WO | 2017/167472 | 10/2017 |

* cited by examiner 9
9.1
HSV1
BC1
BC2
3
5
7
1
USV1
USV2
PE1
PE2
M
EV21
EV11
EV22
EV12
AV21
AV11
AV22
AV12
RSV1
RSV2
A1
A2
BM
10
14
12
RL
FR
FL
RR
HSV2

9B
9.1
BC1
BC2
1B
3
5
7
HSV1
HSV2
USV1
USV2
PE1
PE2
M
RSV1
RSV2
A1
A2
EV11
EV12
EV21
EV22
AV11
AV12
AV21
AV22
BM
10
12
14
RL
FR
FL
RR

HYDRAULIC BRAKE SYSTEM FOR A VEHICLE, AND CORRESPONDING OPERATING METHOD

This application is a 35 U.S.C. § 371 National Stage Application of PCT/EP2018/083914, filed on Dec. 7, 2018, which claims the benefit of priority to Serial No. DE 10 2017 223 497.0, filed on Dec. 21, 2017 in Germany, the disclosures of which are incorporated herein by reference in their entirety.

The disclosure starts with a hydraulic brake system for a vehicle and to a corresponding operating method for such a brake system.

BACKGROUND

The prior art discloses hydraulic brake systems for vehicles, having a master brake cylinder, a hydraulic unit and a plurality of wheel brakes, which comprise various safety systems such as, for example, an antilock brake system (ABS), electronic stability program (ESP) etc., and which can execute various safety functions such as, for example, an antilock brake function, anti-slip regulation (ASR) etc. Control and/or regulating procedures in the antilock brake system (ABS) or in the anti-slip regulation system (ASR system) or in the electronic stability program system (ESP system) can be carried out via the hydraulic unit for a pressure build-up and pressure decrease in the corresponding wheel brakes. To carry out the control and/or regulating procedures, the hydraulic unit comprises solenoid valves which are usually held in distinct positions as a result of the oppositely acting forces "magnetic force", "spring force" and "hydraulic force". Accordingly, there are "normally open" and "normally closed" valve types. Moreover, bistable solenoid valves are known, which change their state with each energization and remain in this state, even without a holding current, until the next energization.

SUMMARY

The hydraulic brake system for a vehicle having the features disclosed herein and the corresponding operating method for a hydraulic brake system having the features disclosed herein have the advantage that a bistable solenoid valve, which alternates between the stable states "open" and "closed" upon energization, is used to confine or trap a current brake pressure in an associated wheel brake. Since the volume of a corresponding brake fluid is highly temperature dependent, temperature changes can result in substantial pressure changes in the brake pressure trapped in the corresponding wheel brake. In embodiments of the disclosure, pressure changes in the brake pressure trapped in a wheel brake which can arise as a result of such temperature changes, for example, are compensated in an advantageous manner.

Embodiments of the present disclosure provide a hydraulic brake system for a vehicle, having a master brake cylinder, a hydraulic unit and a plurality of wheel brakes, wherein the hydraulic unit comprises at least one brake circuit for brake pressure modulation in the wheel brakes. In this case, a bistable solenoid valve is associated with at least one wheel brake, which bistable solenoid valve is seated directly upstream of the associated wheel brake in the corresponding fluid channel and, in a normally open position, enables brake pressure modulation in the associated wheel brake and, in a normally closed position, traps a current brake pressure in the associated wheel brake. Moreover, a volume compensation device, which comprises a connectable accumulator, opens into the corresponding fluid channel between the bistable solenoid valve and the associated wheel brake.

Moreover, an operating method for such a hydraulic brake system is proposed, which, in a pressure-maintaining function, switches the bistable solenoid valve associated with the at least one wheel brake to the normally closed position and traps a current brake pressure in the associated wheel brake. Moreover, the connectable accumulator of the volume compensation device is disconnected from the associated wheel brake in travelling mode and is connected to the associated wheel brake during the pressure-maintaining function in order to maintain a constant trapped brake pressure in the associated wheel brake.

As a result of the bistable solenoid valve, it is possible, with little additional expenditure on a usually present hydraulic unit with ESP functionality, to realize an additional function which can electrohydraulically trap a current pressure in the corresponding wheel brake and, with a low energy requirement, maintain it over a relatively long time period. This means that the existing pressure supply, the pipelines from the hydraulic unit to the wheel brakes and also sensor and communication signals can be used not only for the ESP function and/or ABS function and/or ASR function, but also for an electrohydraulic pressure-maintaining function in the wheel brakes. It is thus advantageously possible to reduce costs, installation space, weight and wiring with the positive effect of reducing the complexity of the brake system.

Since the bistable solenoid valve is seated directly upstream of the associated wheel brake in the corresponding fluid channel, the possible leakage points can be advantageously reduced, whereby it is easier to maintain a constant trapped brake pressure by means of the volume compensation device.

As a result of the measures and further developments disclosed herein, advantageous improvements to the hydraulic brake system, for a vehicle and the operating method for a hydraulic brake system are possible.

It is particularly advantageous that the volume compensation device can comprise at least one accumulator valve which, in an open position, can connect the accumulator to the corresponding wheel brake and, in a closed position, can disconnect the accumulator from the corresponding wheel brake.

In an advantageous configuration of the hydraulic brake system, the at least one accumulator valve can disconnect the accumulator from the corresponding wheel brake in travelling mode. This means that the bistable solenoid valve is opened and the at least one accumulator valve is closed when the vehicle is in travelling mode. As a result, the typical functions for brake pressure modulation of the associated wheel brake remain advantageously unaffected. Moreover, by disconnecting the accumulator from the corresponding wheel brake in travelling mode, an increase in the pedal travel can be advantageously avoided. Moreover, the at least one accumulator valve can connect the accumulator to the corresponding wheel brake in order to maintain a constant trapped brake pressure in the associated wheel brake. As a result, the accumulator can receive a volume when the temperature increases or discharge a volume when the temperature decreases to enable a constant trapped brake pressure to be maintained.

In a further advantageous configuration of the hydraulic brake system, the at least one accumulator valve can be designed as a bistable solenoid valve. As a result, temperature-related pressure changes in the trapped brake pressure can be advantageously compensated over a relatively long time period with a low energy requirement. Alternatively, the at least one accumulator valve can be designed as a normally open solenoid valve. In this case, in travelling mode, the at least one accumulator valve is energized upon a recognized pedal actuation and thereby closed so that the accumulator volume of the accumulator is always actively disconnected.

In a further advantageous configuration of the hydraulic brake system, a common volume compensation device can be provided for at least two wheel brakes. As a result, the number of volume compensation devices can be kept advantageously small if a constant brake pressure is to be maintained in a plurality of wheel brakes over a relatively long time. The accumulator of the common volume compensation device can be connected to the fluid channels of the at least two wheel brakes via a first accumulator valve and a subsequent branch, for example. Alternatively, the common volume compensation device can comprise an accumulator valve for each associated wheel brake, via which the accumulator of the common volume compensation device can be connected to the fluid channel of the associated wheel brake.

In an advantageous configuration of the operating method, an ambient temperature and/or a brake temperature can be estimated or measured. Moreover, a temperature difference of the brake pressure trapped in the associated wheel brake can be estimated according to the ambient temperature and/or the brake temperature. As a result, a higher brake pressure can be advantageously trapped in the associated wheel brake if a lowering of the brake pressure can be expected as a result of the estimated temperature difference. Moreover, a minimum brake pressure can be trapped in the associated wheel if an increase in the brake pressure can be expected as a result of the estimated temperature difference.

Exemplary embodiments of the disclosure are illustrated in the drawing and will be explained in more detail in the description below. In the drawing, the same reference signs denote components or elements which execute the same or analogous functions.

DETAILED DESCRIPTION

Figure 1:
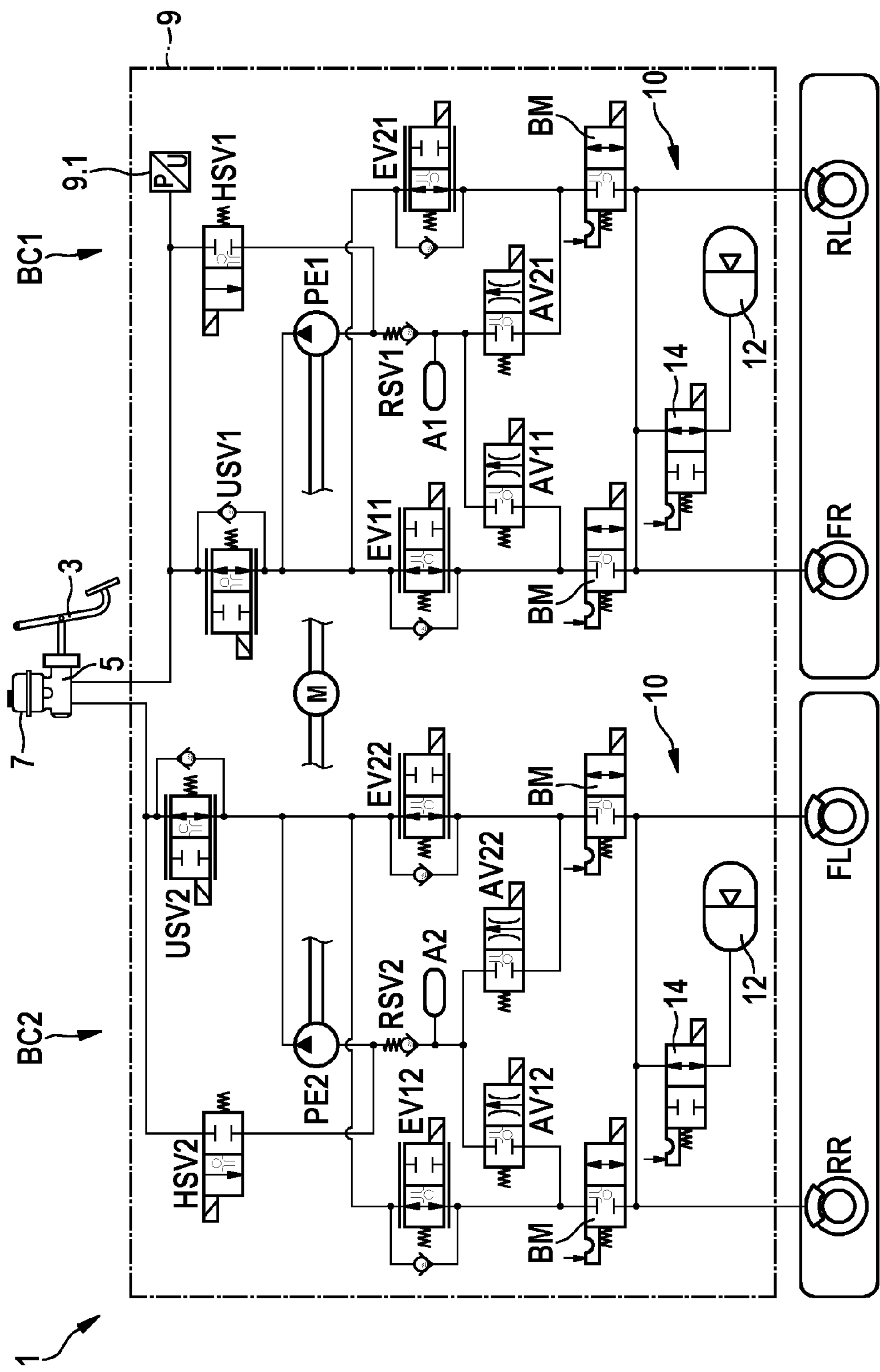
FIG. 1 shows a schematic hydraulic circuit diagram of a first exemplary embodiment of a hydraulic brake system for a vehicle.
Figure 2:
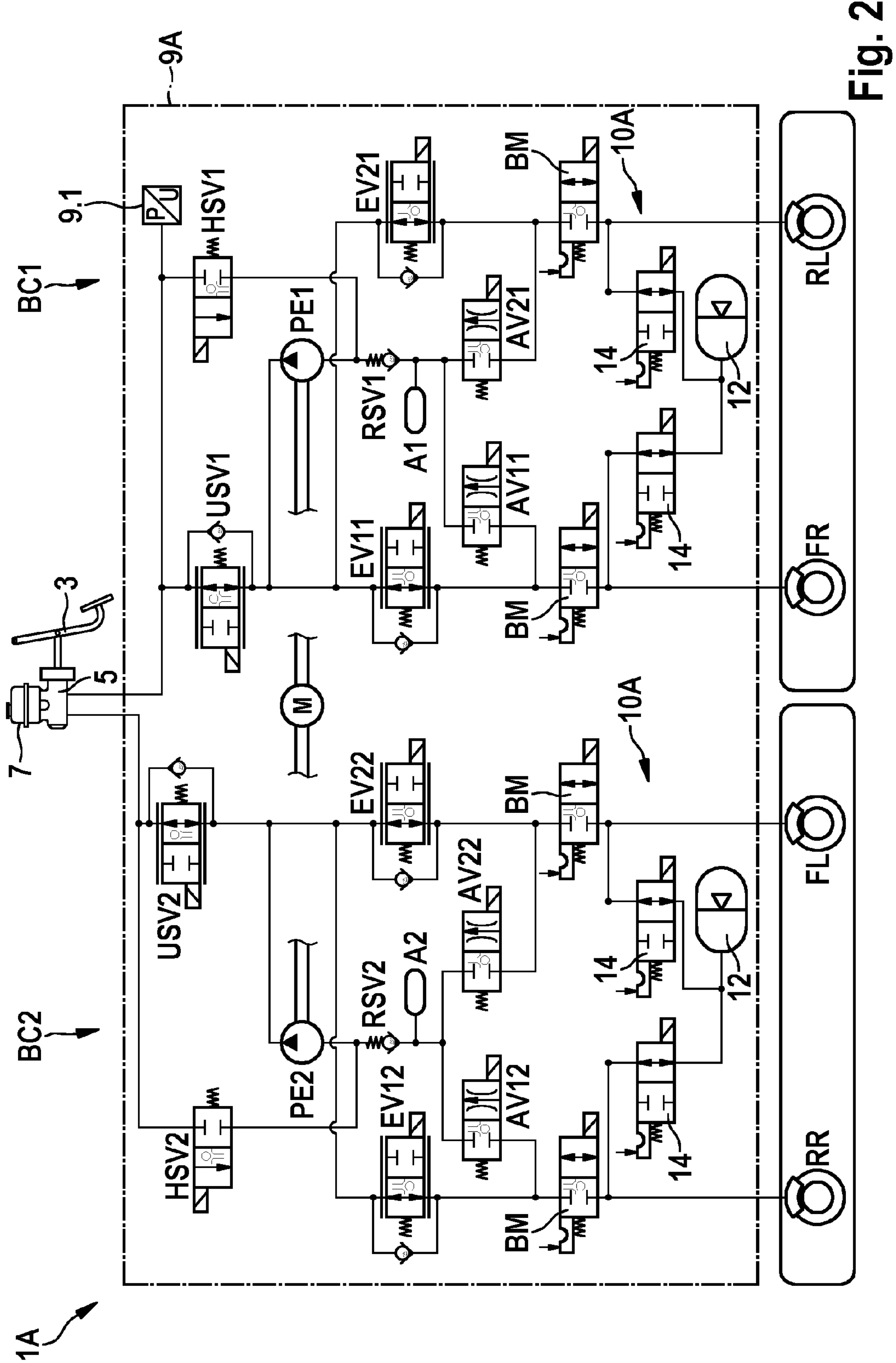
FIG. 2 shows a schematic hydraulic circuit diagram of a second exemplary embodiment of a hydraulic brake system for a vehicle.
Figure 3:
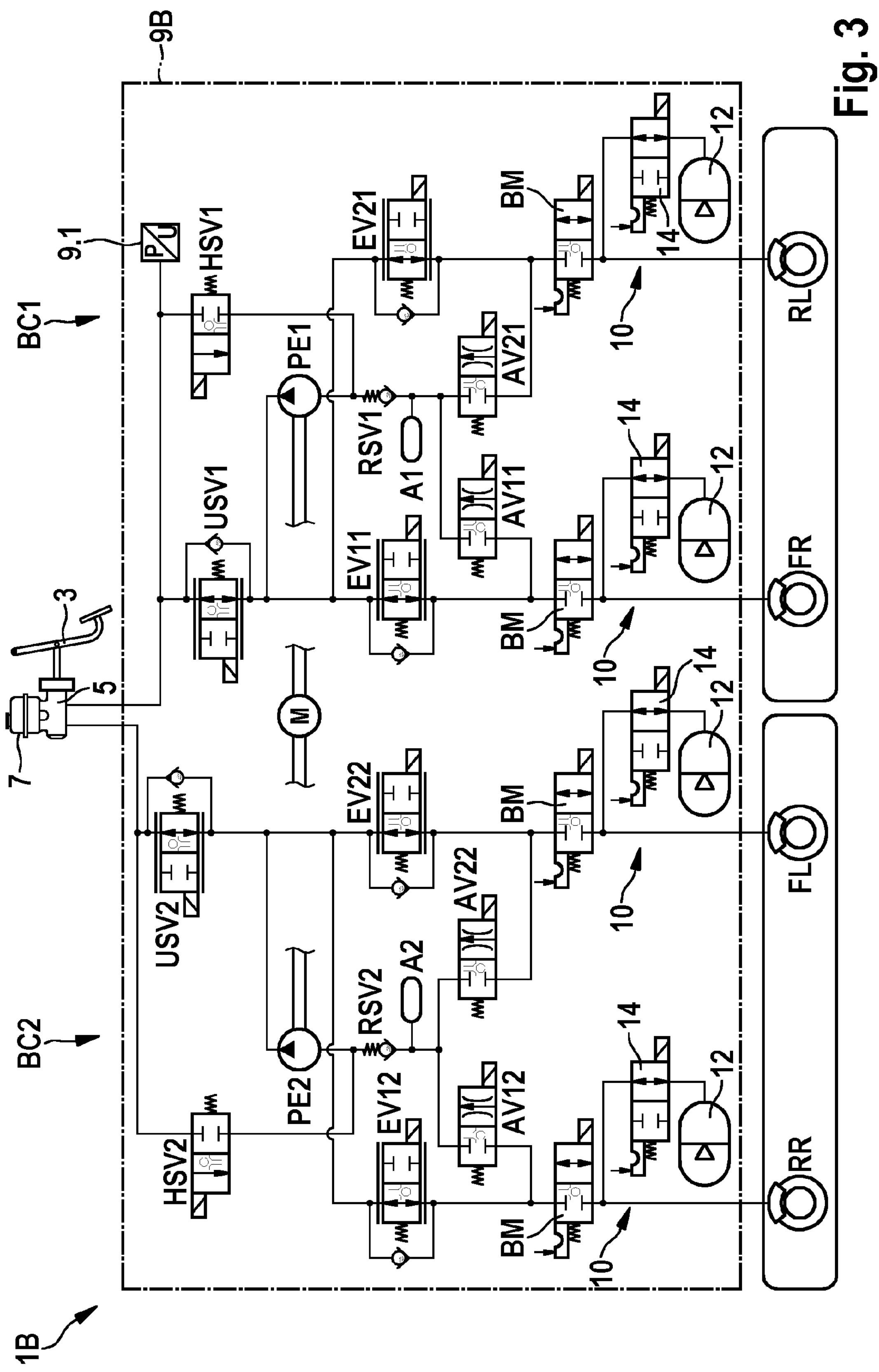
FIG. 3 shows a schematic hydraulic circuit diagram of a third exemplary embodiment of a hydraulic brake system for a vehicle.

As can be seen in FIGS. 1 to 3, illustrated exemplary embodiments of a hydraulic brake system 1, 1A, 1B for a vehicle each comprise a master brake cylinder 5, a hydraulic unit 9, 9A, 9B and a plurality of wheel brakes RR, FL, FR, RL. For brake pressure modulation in the wheel brakes RR, FL, FR, RL, the hydraulic unit 9, 9A, 9B comprises at least one brake circuit BC1, BC2. In this case, a bistable solenoid valve BM is associated with at least one wheel brake RR, FL, FR, RL, which bistable solenoid valve is seated directly upstream of the associated wheel brake RR, FL, FR, RL in the corresponding fluid channel and, in a normally open position, enables brake pressure modulation in the associated wheel brake RR, FL, FR, RL and, in a normally closed position, traps a current brake pressure in the associated wheel brake RR, FL, FR, RL, wherein a volume compensation device 10, 10A which comprises a connectable accumulator 12 opens into the corresponding fluid channel between the bistable solenoid valve BM and the associated wheel brake RR, FL, FR, RL.

As can further be seen from FIGS. 1 to 3, the illustrated exemplary embodiments of the hydraulic brake system 1, 1A, 1B for a vehicle each comprise two brake circuits BC1, BC2 with which two of four wheel brakes RR, FL, FR, RL are associated in each case. Therefore, a first wheel brake FR, which is arranged, for example, on the right side on a vehicle front axle, and a second wheel brake RL, which is arranged, for example, on the left side on a vehicle rear axle, are associated with a first brake circuit BC1. A third wheel brake RR, which is arranged, for example, on the right side on a vehicle rear axle, and a fourth wheel brake FL, which is arranged, for example, on the left side on the vehicle front axle, are associated with a second brake circuit BC2. An inlet valve EV11, EV21, EV12, EV22 and an outlet valve AV11, AV21, AV12, AV22 are associated with each wheel brake RR, FL, FR, RL, wherein pressure can be built up in the corresponding wheel brake RR, FL, FR, RL via the inlet valves EV11, EV21, EV12, EV22 in each case, and wherein pressure can be decreased in the corresponding wheel brake RR, FL, FR, RL via the outlet valves AV11, AV21, AV12, AV22 in each case. For the pressure build-up in the respective wheel brake RR, FL, FR, RL, the corresponding inlet valve EV11, EV12, EV21, EV22 is opened and the corresponding outlet valve AV11, AV12, AV21, AV22 is closed. For the pressure decrease in the respective wheel brake RR, FL, FR, RL, the corresponding inlet valve EV11, EV21, EV12, EV22 is closed and the corresponding outlet valve AV11, AV21, AV12, AV22 is opened.

As can further be seen from FIGS. 1 to 3, a first inlet valve EV11 and a first outlet valve AV11 are associated with the first wheel brake FR, a second inlet valve EV21 and a second outlet valve AV21 are associated with the second wheel brake RL a third inlet valve EV12 and a third outlet valve AV12 are associated with the third wheel brake RR and a fourth inlet valve EV22 and a fourth outlet valve AV22 are associated with the fourth wheel brake FL. Control and/or regulating procedures for implementing an ABS function can be carried out via the inlet valves EV11, EV21, EV12, EV22 and the outlet valves AV11, AV21, AV12, AV22.

Moreover, the first brake circuit BC1 has a first intake valve HSV1, a first system pressure adjustment valve USV1, a first compensation reservoir A1 with a first non-return valve RSV1 and a first fluid pump PE1. The second brake circuit BC2 has a second intake valve HSV2, a second system pressure adjustment valve USV2, a second compensation reservoir A2 with a second non-return valve RSV2 and a second fluid pump PE2, wherein the first and second fluid pump PE1, PE2 are driven by a common electric motor M. The hydraulic unit 9, 9A, 9B furthermore comprises a sensor unit 9.1 for determining the current system pressure or brake pressure. For brake pressure modulation and for implementing an ASR function and/or an ESP function, the hydraulic unit 9, 9A, 9B uses the first system pressure adjustment valve USV1, the first intake valve HSV1 and the first return pump PE1 in the first brake circuit BC1 and the second system pressure adjustment valve USV2, the second intake valve HSV2 and the second return pump PE2 in the second brake circuit BC2. As can further be seen in FIGS. 1 to 3, each brake circuit BC1, BC2 is connected to the master brake cylinder 5, which can be actuated via a brake pedal 3. Moreover, a fluid reservoir 7 is connected to the master brake cylinder 5. The intake valves HSV1, HSV2 enable intervention in the brake system without a request by the driver. To this end, the respective intake path for the corresponding fluid pumps PE1, PE2 to the master brake cylinder 5 is opened via the intake valves HSV1, HSV2, so that these can provide the necessary regulating pressure instead of the driver. The system pressure adjustment valves USV1, USV2 are arranged between the master brake cylinder 5 and at least one associated wheel brake RR, FL, FR, RL and adjust the system pressure or brake pressure in the associated brake circuit BC1, BC2. As can further be seen from FIGS. 1 to 3, a first system pressure adjustment valve USV1 adjusts the system pressure or brake pressure in the first brake circuit BC1 and a second system pressure adjustment valve USV2 adjusts the system pressure or brake pressure in the second brake circuit BC2.

As can further be seen from FIGS. 1 to 3, in the illustrated exemplary embodiments, four bistable solenoid valves BM are each seated directly upstream of an associated wheel brake RR, FL, FR, RL in the respective fluid channel.

As can further be seen from FIGS. 1 to 3, in the illustrated exemplary embodiments, the volume compensation device 10, 10A comprises at least one accumulator valve 14, which, in an open position, connects the accumulator 12 to the corresponding wheel brake RR, FL, FR, RL and, in a closed position, disconnects the accumulator 12 from the corresponding wheel brake RR, FL, FR, RL. The at least one accumulator valve 14 disconnects the accumulator 12 from the corresponding wheel brake RR, FL, FR, RL in travelling mode. Outside of travelling mode, the at least one accumulator valve 14 connects the accumulator 12 to the corresponding wheel brake RR, FL, FR, RL in order to maintain a constant trapped brake pressure in the associated wheel brake RR, FL, FR, RL. In the illustrated exemplary embodiments, the at least one accumulator valve 14 is designed as a bistable solenoid valve. In an alternative exemplary embodiment, not illustrated, the at least one accumulator valve 14 is designed as a normally open solenoid valve.

As can further be seen from FIGS. 1 and 2, in the illustrated exemplary embodiments of the hydraulic brake system 1, 1A, a common volume compensation device 10, 10A is provided for the, in each case, two wheel brakes RR, FL, FR, RL of one of the brake circuits BC1, BC2.

As can further be seen from FIG. 1, in the illustrated first exemplary embodiment, the two accumulators 12 of the common volume compensation devices 10 are each connected to the fluid channels of the two associated wheel brakes RR, FL, FR, RL via a first switching valve 14 and via a subsequent branch designed as a T-piece.

As can further be seen from FIG. 2, in the illustrated second exemplary embodiment, the two accumulators 12 of the common volume compensation devices 10A are each connected to the fluid channels of the two associated wheel brakes RR, FL, FR, RL via two switching valves 14. This means that the common volume compensation device 10A comprises an accumulator valve 14 for each associated wheel brake RR, FL, FR, RL, via which the accumulator 12 of the common volume compensation device 10A can be connected to the fluid channel of the associated wheel brake RR, FL, FR, RL.

As can further be seen from FIG. 3, a volume compensation device 10 with an accumulator 12 and an accumulator valve 14 is associated with each wheel brake RR, FL, FR, RL.

According to embodiments of the operating method, in a pressure-maintaining function, the bistable solenoid valve 10 associated with the at least one wheel brake RR, FL, FR, RL is switched to the normally closed position and a current brake pressure is trapped in the associated wheel brake RR, FL, FR, RL, wherein a connectable accumulator 12 of the volume compensation device 10, 10A is disconnected from the associated wheel brake RR, FL, FR, RL in travelling mode, and, outside of travelling mode, is connected to the associated wheel brake RR, FL, FR, RL during the pressure-maintaining function in order to maintain a constant trapped brake pressure in the associated wheel brake RR, FL, FR, RL.

To improve the operating method, an ambient temperature and/or a brake temperature is estimated or measured. A temperature difference of the brake pressure trapped in the associated wheel brake RR, FL, FR, RL is then estimated according to the ambient temperature and/or the brake temperature. Based on the estimate, a higher brake pressure can be trapped in the associated wheel brake RR, FL, FR, RL if a lowering of the brake pressure can be expected as a result of the estimated temperature difference. Alternatively, a minimum brake pressure can be trapped in the associated wheel brake RR, FL, FR, RL if an increase in the brake pressure can be expected as a result of the estimated temperature difference.

Embodiments of the present disclosure provide a hydraulic brake system for a vehicle, which, with little additional expenditure on the hydraulic unit, comprises the additional function of maintaining the pressure in the wheel brakes electrohydraulically. In this case, embodiments of the present disclosure advantageously enable the compensation of any possible internal leakage and expansions in volume, which can occur, for example, as a result of temperature changes. By means of the volume compensation device, a constant trapped brake pressure can be maintained in the at least one associated wheel brake RR, FL, FR, RL over a relatively long period of time in the normally open position of the bistable solenoid valve BM.

The invention claimed is:

1. A hydraulic brake system for a vehicle, comprising:

a master brake cylinder;

a plurality of wheel brakes;

a hydraulic unit comprising at least one brake circuit configured to modulate brake pressure in the plurality of wheel brakes;

a first bistable solenoid valve associated with at least one wheel brake of the plurality of wheel brakes, the first bistable solenoid valve seated directly upstream of the at least one wheel brake in a corresponding fluid channel and the first bistable solenoid valve, in a normally open position, enabling brake pressure modulation in the at least one wheel brake and, in a normally closed position, trapping a current brake pressure in the at least one wheel brake; and a volume compensation device comprising a connectable accumulator, the volume compensation device opening into the corresponding fluid channel between the first bistable solenoid valve and the at least one wheel brake, wherein the first bistable solenoid valve is configured, in the normally closed position, to isolate the volume compensation device from the master brake cylinder when the volume compensation device is connected to the at least one wheel brake.

2. The hydraulic brake system as claimed in claim 1, wherein the volume compensation device further comprises at least one accumulator valve, which, in an open position, connects the accumulator to the at least one wheel brake and, in a closed position, disconnects the accumulator from the at least one wheel brake.

3. The hydraulic brake system as claimed in claim 2, wherein the at least one accumulator valve disconnects the accumulator from the at least one wheel brake in a travelling mode.

4. The hydraulic brake system as claimed in claim 2, wherein the at least one accumulator valve connects the accumulator to the at least one wheel brake to maintain a constant trapped brake pressure in the at least one wheel brake.

5. The hydraulic brake system as claimed in claim 2, wherein the at least one accumulator valve includes a second bistable solenoid valve.

6. The hydraulic brake system as claimed in claim 2, wherein the at least one accumulator valve includes a normally open solenoid valve.

7. The hydraulic brake system as claimed in claim 1, wherein the volume compensation device is shared by at least two wheel brakes of the plurality of wheel brakes.

8. The hydraulic brake system as claimed in claim 7, wherein the accumulator of the common volume compensation device is connected to fluid channels of the at least two wheel brakes via a first accumulator valve and a branch.

9. The hydraulic brake system as claimed in claim 7, wherein the common volume compensation device comprises an accumulator valve for each associated wheel brake of the at least two wheel brakes, each accumulator valve configured to connect the accumulator of the common volume compensation device to an associated fluid channel of the associated wheel brake.

10. An operating method for a hydraulic brake system, which includes (i) a master brake cylinder, (ii) a plurality of wheel brakes, (iii) a hydraulic unit comprising at least one brake circuit configured to modulate brake pressure in the plurality of wheel brakes, (iv) a first bistable solenoid valve associated with at least one wheel brake of the plurality of wheel brakes, the first bistable solenoid valve seated directly upstream of the at least one wheel brake in a corresponding fluid channel and the first bistable solenoid valve, in a normally open position, enabling brake pressure modulation in the at least one wheel brake and, in a normally closed position, trapping a current brake pressure in the at least one wheel brake; and (v) a volume compensation device comprising a connectable accumulator, the volume compensation device opening into the corresponding fluid channel between the first bistable solenoid valve and the at least one wheel brake, the method comprising:

in a pressure-maintaining function, switching a second bistable solenoid valve associated with at least one wheel brake to a normally closed position and trapping a current brake pressure in the associated at least one wheel brake;

in a travelling mode, disconnecting a connectable accumulator of a volume compensation from the associated at least one wheel brake; and connecting the connectable accumulator to the associated at least one wheel brake during the pressure-maintaining function to maintain a constant trapped brake pressure in the associated at least one wheel brake.

11. The operating method as claimed in claim 10, further comprising:

estimating or measuring at least one of an ambient temperature and a brake temperature.

12. The operating method as claimed in claim 11, further comprising:

estimating a temperature difference of the constant trapped brake pressure trapped in the associated at least one wheel brake according to the at least one of the ambient temperature and the brake temperature.

13. The operating method as claimed in claim 12, wherein the switching of the second bistable solenoid valve further comprises trapping a higher brake pressure in the associated at least one wheel brake if a lowering of the brake pressure is expected as a result of the estimated temperature difference.

14. The operating method as claimed in claim 12, wherein the switching of the second bistable solenoid valve further comprises trapping a minimum brake pressure in the associated at least one wheel brake if an increase in the brake pressure is expected as a result of the estimated temperature difference.

* * * * *